US007243858B2

(12) United States Patent
Hall

(10) Patent No.: US 7,243,858 B2
(45) Date of Patent: Jul. 17, 2007

(54) DAMPER AND AN ASSEMBLY THEREWITH

(75) Inventor: Michael J. Hall, Manhattan, IL (US)

(73) Assignee: Illinois Tool Works, Inc., Glenview, IL (US)

( * ) Notice: Subject to any disclaimer, the term of this patent is extended or adjusted under 35 U.S.C. 154(b) by 2 days.

(21) Appl. No.: 11/389,836

(22) Filed: Mar. 27, 2006

(65) Prior Publication Data

US 2006/0175422 A1 Aug. 10, 2006

(51) Int. Cl.
*G05D 23/00* (2006.01)

(52) U.S. Cl. ........................................ 236/94; 236/1 C

(58) Field of Classification Search ................ 236/1 C, 236/91 D, 94; 78/531, 553; 188/290, 293, 188/296
See application file for complete search history.

(56) References Cited

U.S. PATENT DOCUMENTS 4,795,867 A * 1/1989 Ohi et al. ................ 200/37 R
6,441,806 B1 * 8/2002 Jaeger ........................ 345/172
6,639,508 B1 * 10/2003 Martin ....................... 338/162
2006/0012584 A1 * 1/2006 Vassallo et al. ............ 345/184

* cited by examiner

*Primary Examiner*—Marc Norman
(74) *Attorney, Agent, or Firm*—Mark W. Croll; Paul F. Donovan

(57) ABSTRACT

A damper that is mounted to a printed circuit board of an automobile's climate control system includes a tactile feel and torque control mechanism for the user as the user controls the temperature and climate within the interior of an automobile. The damper incorporates a plurality of detents that engage with a plurality of ribs or similar protrusions for providing the desired tactile feel and torque control in the control knob of the climate control system. The printed circuit board used with the automobile's climate control system has an integrated polymer thick film (PTF) circuit that replaces the traditional circuit board technology, thereby eliminating the need for separately mounted potentiometers and resistors as those items can be printed onto the polymer circuit. The printed circuit board is less expensive to manufacture over existing circuit board technology, is easier to assemble, results in fewer parts, and is environmentally friendly as no soldering of components is required. In addition, the invention is impervious to cleaning processes and solutions and is more durable over other known systems and technologies.

13 Claims, 4 Drawing Sheets

DAMPER AND AN ASSEMBLY THEREWITH

CROSS REFERENCE TO RELATED APPLICATION

This Non-Provisional Application claims benefit to U.S. Provisional Application Ser. No. 60/451,775 filed Mar. 4, 2003.

FIELD OF THE INVENTION

The present invention relates generally to automotive air control systems and more particularly to dampers and circuit boards for use in automotive air control systems.

BACKGROUND OF THE INVENTION

It is known for automobiles to provide passengers with the ability to adjust the temperature and climate within the passenger compartment of the automobile. For example, passengers are able to adjust the automobile's interior temperature by controlling the amount of hot or cold air delivered by the heater or air conditioner units. Passengers are able to not only adjust the amount of air-flow into the interior compartment, they are able to direct the location of the delivered air. It is further known that these automotive air control systems incorporate user-adjustable control knobs on the automobile's interior dashboard or control panel to permit the passengers to adjust the amount, type and direction of air-flow to the interior passenger compartment. These known adjustable knobs are conventionally mounted to the dashboard panel and are connected to underlying circuit boards mounted to the back surface of the dashboard. Conventional circuit boards include multiple components mounted to the circuit boards to control the operation of the automotive air control system. For example, potentiometers and other similar components are mounted to, or incorporated on, the circuit board using traditional methods such as soldering, through-hole mounting and surface mount technology to control the operation of the air control system. In addition, multiple resistors are often mounted to the circuit boards using similar techniques to provide multiple resistance values to further control the functions of the air control system.

The existing circuit board technology for providing temperature and climate control within the interior of an automobile has been mostly effective and useful. However, such technology has certain drawbacks. By way of example, the circuit board technology requires multiple components and parts that require considerable assembly and labor, including the need to solder the potentiometers and resistors to the circuit board. The soldered components are subject to damage when exposed to cleaning processes and solutions because they deteriorate the soldered connections between the potentiometers and resistors to the circuit boards. Other drawbacks exist with respect to existing circuit board technology that are overcome by the present invention.

SUMMARY OF THE INVENTION

The present invention is directed to the use of a damper assembly and printed circuit board technology that may be used, for example, to control the climate within the interior of the automobile. The damper of the present invention provides the user with the desirable tactile feel and torque control when operating the control knobs as the user adjusts the climate within the interior of the automobile. The damper is mounted to a printed circuit board having an integrated polymer thick film (PTF) circuit. In response to the user's adjustment of the control knobs, the PTF circuit signals the automobile's air conditioner or heater unit to adjust temperature and air flow within the interior compartment of the automobile. The printed circuit board including the PTF circuit is a highly engineered, low-cost alternative to traditional circuit board technology. The present invention eliminates the need for separately mounted potentiometers and resistors as these components can be printed onto the PTF circuit. The invention is less expensive to manufacture over existing circuit board technology, is easier to assemble, and is environmentally friendly as no soldering of components is required. In addition, the invention is impervious to cleaning processes and solutions and is more durable over other known systems and technologies.

Other features and advantages of the invention will become apparent to those skilled in the art upon review of the following detailed description, claims and drawings in which like numerals are used to designate like features.

Figure 1:
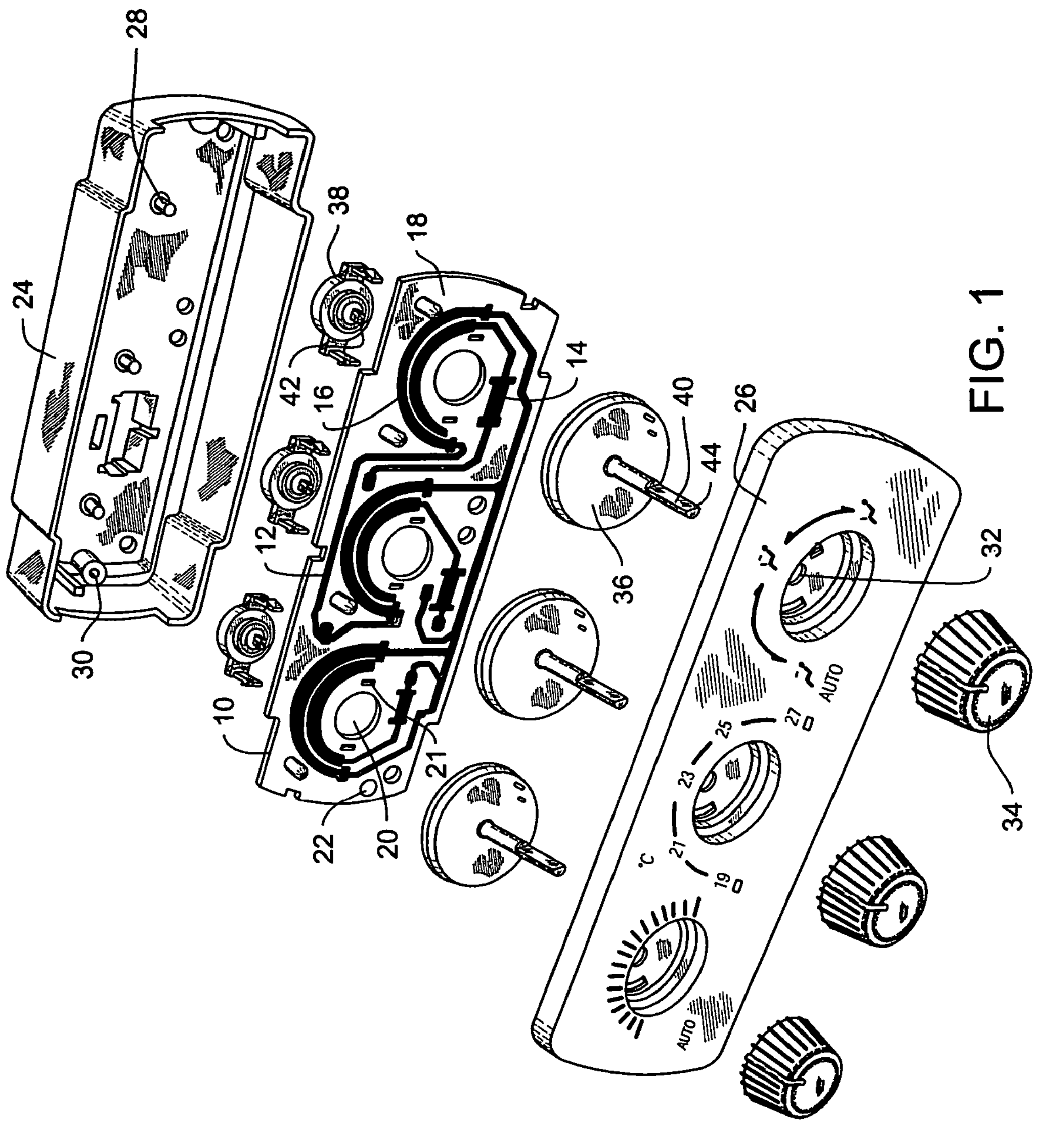
FIG. 1 is an isometric view of an exemplary assembly of a printed circuit board and damper assembly of the present invention.

Before the embodiments of the invention are explained in detail, it is to be understood that the invention is not limited in its application to the details of construction and the arrangement of the components set forth in the following description or illustrated in the drawings. The invention is capable of other embodiments and of being practiced or being carried out in various ways. Also, it is to be understood that the phraseology and terminology used herein are for the purpose of description and should not be regarded as limiting. The use of "including" and "comprising" and variations thereof is meant to encompass the items listed thereafter and equivalents thereof as well as additional items and equivalents thereof.

DETAILED DESCRIPTION OF THE EMBODIMENTS

Referring to FIG. 1, an exemplary embodiment of the invention includes a printed circuit board 10 mounted between a back housing 24 and a control panel 26. Mounted to the circuit board 10 is a control knob 34, a retainer 36 and a damper 38. The details of the components of the exemplary embodiment of the invention are described below.

The printed circuit board 10 incorporates a polymer thick film (PTF) circuit 12. The printed circuit board 10 and PTF circuit 12 may be used in numerous applications including, without limitation, automotive applications, HVAC controls, memory systems, dimmer systems, throttle controls, position sensors and numerous other applications. In the exemplary embodiment of FIG. 1, the printed circuit board 10 and PTF circuit 12 are used in an automotive application and specifically an automotive air control system.

The exemplary PTF circuit 10 incorporates screen printable polymer resins that may be used as conductors, resistors, potentiometers, switch pads, and the like. Unlike conventional systems, the PTF circuit 10 does not require the soldering of components, such as the resistors and potentiometers onto the circuit board. In addition, with the screen printable polymer resin system integrated into the PTF circuit 10, the PTF circuit 10 is impervious to cleaning processes and solutions, making the circuit more durable over conventional circuit board technology.

As is known in the art, polymer thick film is a thermoset, meaning that once it is cured or "set" by chemical reaction, it cannot be remelted or reflowed. Materials used to make PTF circuits can be carbon or silver based, or combinations thereof. In the exemplary PTF circuit 12 of the printed circuit board 10, carbon ink is used for making fixed resistors 14 and potentiometers 16 and silver ink is used for conductivity. It should be understood that with the present invention, carbon and silver inks may be blended together to achieve custom resistances, depending on the desired application. One of skill in the art will understand that the PTF process can also be used in conjunction with traditional copper etched circuitry.

The exemplary printed circuit board 10 and integrated PTF circuit 12 may be produced by a sequence of printing and curing operations. First, the conductive ink is selectively applied to the substrate of the printed circuit board 10 by using a known screening process. Next, the circuit board 10 is passed through an oven for curing. Depending on the complexity of the circuit, multiple print-and-cure cycles may be required to achieve the desired circuit.

The exemplary PTF circuit 12 provides numerous advantages over traditional circuit board technology. For instance, the PTF circuit 12 eliminates conventional potentiometers, numerous switch components, and wire harnesses. Significantly, with the PTF circuit 12, multiple resistor values can be printed with a single screen pass of carbon ink.

As depicted in FIG. 1, the printed circuit board 10 defines a planar surface 18 and, in addition to the screen-printed resistors 14 and potentiometers 16, includes a plurality of openings 20, 21 extending through the circuit board 10 through which are mounted the control knobs 34, retainers 36 and dampers 38, as discussed below. The printed circuit board 10 further defines mounting holes 22 which permit the mounting of the circuit board 10 to the back housing 24 and the control panel 26. It is contemplated that other techniques for mounting or attaching the circuit board 10 to the control panel 26 are possible and within the scope of the invention.

The back housing 24 is a molded structure shaped to match the exterior shape of the circuit board 10. The back housing 24 may include a plurality of alignment pins 28 for aligning and mounting the circuit board 10 between the housing 24 and the control panel 26. In addition, the housing 24 may include conventional outwardly extending threaded bosses 30 for receiving fasteners, not shown, to secure the circuit board 10 to the housing 24 and control panel 26. It should be understood that other shapes and structures of the housing 24 are possible and that the housing may be further mounted to other structures within the automobile using any of the numerous known mounting techniques.

The control panel 26 is shown as a typical climate control panel found in known automobiles. The control panel 26 includes openings 32 for receiving the retainers 36, on which is mounted the control knobs 34. The control panel 26 may be secured to the automobile's dashboard and the back housing 24 through any known mounting technique, including through the use of fasteners, adhesives and the like. As one of skill in the art would expect, other shapes, styles, and designs of the control panel 26 are possible with the invention, depending on the desired application.

One aspect of the present invention is the incorporation of a tactile feel and torque control sensed by a user when operating the control knob 34. The tactile feel and torque control are desirable to users and were previously created with the separately-mounted potentiometers. With the elimination of the conventional potentiometers, the tactile feel and torque control are provided through the use of an exemplary damper 38 of the invention. As discussed below, the control knob 34, retainer 36, and damper 38 are operatively coupled together and upon rotating the control knob 34, which in turn operates the retainer 36 and damper 38, the damper 38 will provide the user with the desired tactile feel and torque control, through the techniques and features of the invention described below.

Figure 2:
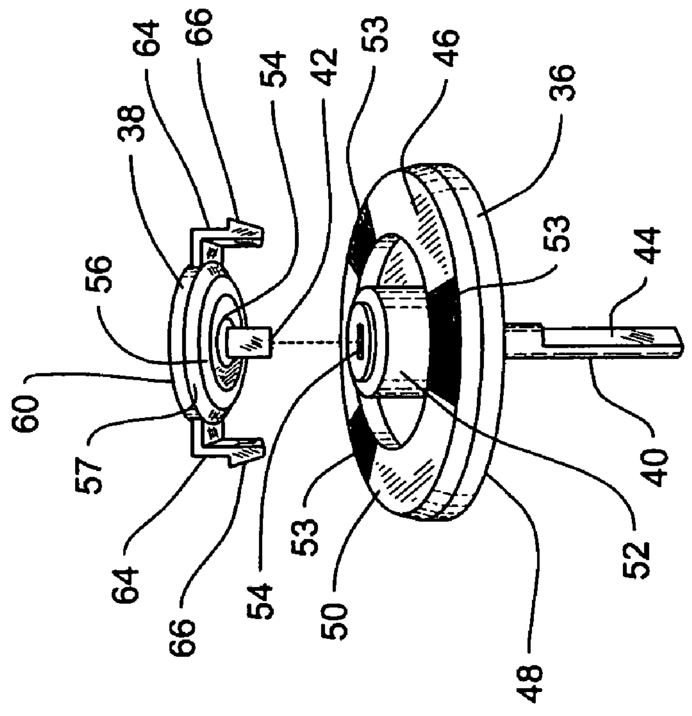
FIG. 2 is an isometric view of the damper and retainer of the invention of FIG. 1.

Referring to FIG. 1, the control knob 34 is operatively coupled to a shaft 40 of the retainer 36, which is operatively coupled to shaft 42 of the damper 38. As illustrated in FIGS. 1 and 2, the shaft 40 of the retainer 36 defines a flat surface portion 44. When mounted to a mating opening in the control knob 34, not shown but known to those skilled in the art, the torque applied to the control knob 34 by a user will transfer to the shaft 40 of the retainer 36, thereby rotating the retainer 36. As illustrated, the retainer 36 includes a circular, planar base 46 defining a front surface 48 and a back surface 50. Mounted to and extending outwardly from the front surface 48 is the shaft 40. Located on the back surface 50 is a centrally positioned, annular shaped receptor 52 that receives the shaft 42 of the damper 38. The receptor 52 includes an aperture 54 that is sized and shaped to operatively engage with a flat surface portion 54 of the shaft 42 of the damper 38. As above, as the retainer 36 is rotatably driven by the control knob 34, the retainer 36 transfers the torque to the shaft 42 of the damper 38. Also located on the back surface 50 are electrical contacts 53 that electrically communicate with the screen printed material, such as the resistors 14 and potentiometers 16 of the PTF circuit 12 on the printed circuit board 10. As the user rotates the control knob 34, the electrical contacts will rotate across the potentiometers 16, thereby adjusting the electrical signal provided by the PTF circuit 12 to the controls of the automobile's air control system, for example.

Figure 3:
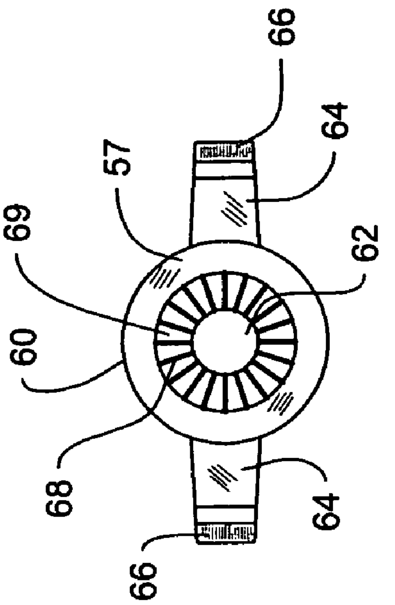
FIG. 3 depicts a bottom plan view of an exemplary damper housing of the present invention.
Figure 4:
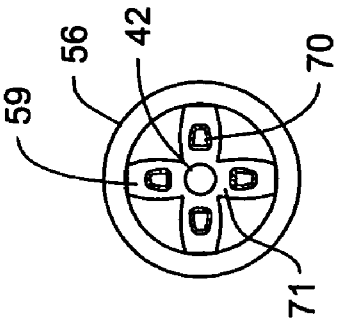
FIG. 4 depicts a top plan view of an exemplary rotatable damper body that mounts to the damper housing of the present invention.

Referring to FIGS. 2-4, in an exemplary embodiment, the damper 38 includes two primary components—a rotatable circular body 56 mounted within a circular housing 57. The circular body 56 rotates relative to the circular housing 57. A fluid commonly used in known gear dampers is provided in the damper housing 57 to provide the desired rotational torque resistance of the circular body 56 relative to the circular housing 57.

As depicted in FIG. 4, which is a view of the portion of the circular body 56 that is positioned within the circular housing 57, the circular body 56 includes the shaft 42 centrally positioned on the circular body 56 and a plurality of radial extensions 59 defining a fan-shaped appearance. The fan-shaped radial extensions 59 define a surface 71 on which is positioned a plurality of ribs or projections 70 extending outwardly from the surface 71. The ribs or projections 70 may take on various shapes, forms, and profiles, including the depicted rounded protuberance shape. As discussed below, the ribs or projections 70 engage a plurality of detents 68 formed on the inner surface of the circular housing 57 to provide the desired tactile feel in the control knob 34.

As depicted in FIGS. 2 and 3, the circular housing 57 defines a peripheral edge 60 and a pair of opposing L-shaped retaining tabs 64 extending outwardly from the peripheral edge 60. Each retaining tab 64 defines wedge shaped end portions 66 that, as assembled, mate with the openings 21 formed in the circuit board 10 to snap-fit and secure the damper 38 onto the circuit board 10. More specifically, the retaining tabs 64 are pressed through the openings 21 in the circuit board 10 and will snap-fit into the openings 21 when the wedge shaped end portions 66 pass through the openings 21. The damper 38 will then be removably secured to the circuit board 10. Positioned on an inner surface 69 of the circular housing 57 is a plurality of detents 68. The detents 68 are oriented radially from a central opening 62. The detents 68 make take on various shapes, forms, and profiles. As discussed below, the detents 68 operatively engage with the plurality of ribs or projections 70 on the circular body 56 to provide the desired tactile feel in the control knob 34. The central opening 62 is sized and shaped to engage with and mount onto the alignment pin 28 extending outwardly from the back housing 24.

As assembled, the plurality of ribs 70 will engage with the plurality of detents 68. Upon rotation of the control knob 34, which is operatively coupled to the shaft 42 of the circular body 56, each of plurality of ribs 70 will disengage with the mating detent 68 and will re-engage with the next adjacent detent 68. As the control knob 34 continues to rotate, each rib 70 will continue to move to and engage with the next adjacent detent 38, and so on. The repeated engagement and disengagement of each rib 70 with the detent 68 as the control knob 34 is rotated creates the desired tactile feel in the control knob 34. The damper fluid provided in the damper housing 57 will provide additional rotational resistance of the circular body 56 relative to the housing 57, thereby creating the desired rotational torque resistance of the control knob 34. It should be understood by those skilled in the art that the detent and torque characteristics can be modified and customized by changing the number, spacing, shape, positioning or configuration of the detents 68 and ribs 70, depending on the desired application. Moreover, the damper 38 may be designed to handle multiple torque requirements, achieved by changing the viscosity of the fluid located within the housing 57.

Figure 6:
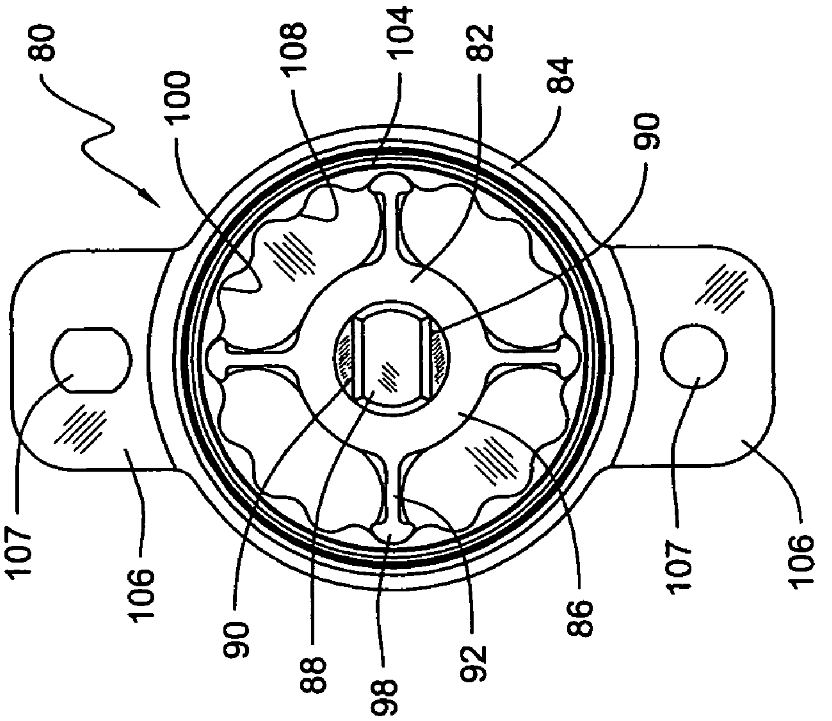
FIG. 6 depicts a top plan view of the damper of FIG. 5.
Figure 5:
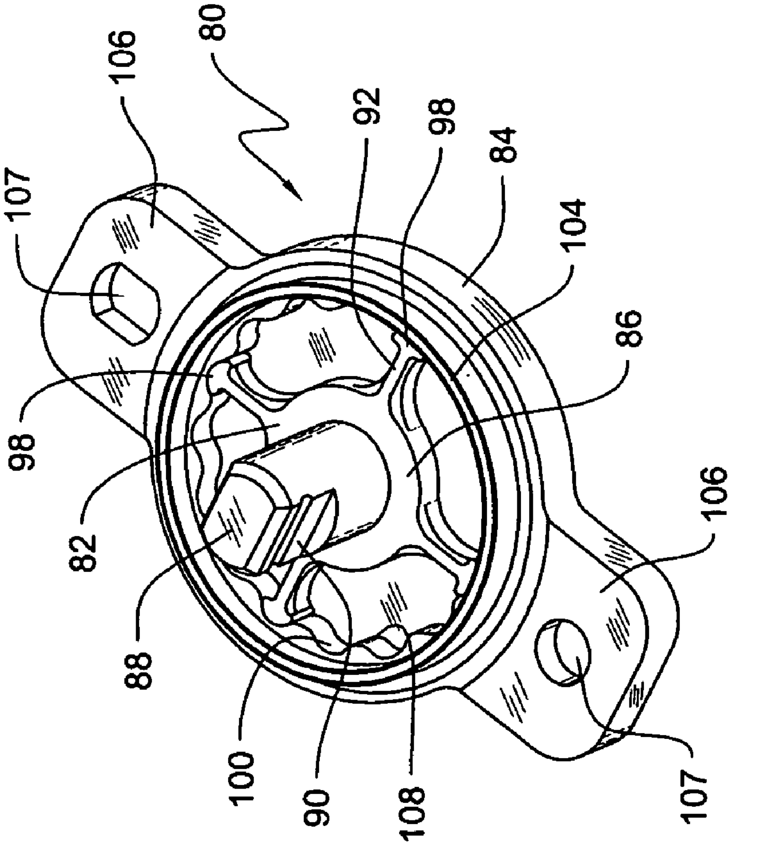
FIG. 5 depicts an isometric view of another exemplary embodiment of the damper of the present invention.
Figure 8:
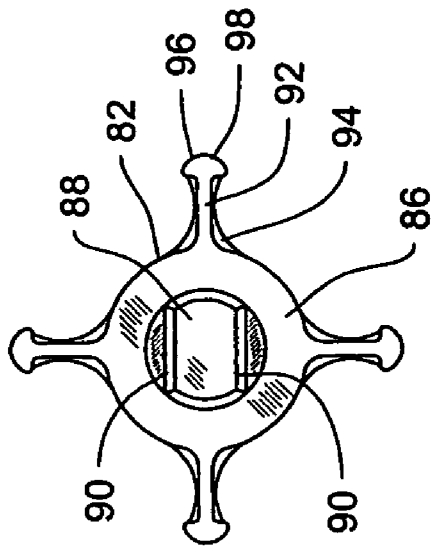
FIG. 8 depicts a top plan view of the rotatable body of the damper of FIG. 5.

Referring to FIGS. 5-8, there is depicted another exemplary embodiment of the damper of the present invention. As depicted, the damper 80 includes a rotatable body 82 mounted within a housing 84. Similar to the other exemplary embodiment, the rotatable body 82 rotates relative to the housing 84. Referring to FIGS. 5, 6 and 8, the rotatable body 82 includes a central portion 86 and a shaft 88 positioned on and extending outwardly from the central portion 86. The shaft 88 is generally cylindrical and includes opposing flat portions 90 at the distal end of the shaft 88. The opposing flat portions 90, along with the shaft 88 are sized and shaped to operatively engage with the aperture 54 of the receptor 52 on the retainer 36, as described above. The engagement of the retainer 36 with the damper 80 permits the transfer of rotational movement from the retainer 36 to the damper 80 and specifically to the rotatable body 82. Extending outwardly from the central portion 86 are a plurality of flexible arms 92. In the exemplary embodiment, the arms 92 are spaced equidistant from each other around the central portion 86 and are oriented radially relative to the central portion 86. The arms 92 include a proximal end 94 formed integral with the central portion 86, and a distal end 96 that defines a head 98. In the exemplary embodiment, the head 98 is rounded or defines a crown-shaped profile that, as assembled, will engage with a plurality of detents 100 formed on an inner wall 102 of a housing body 104 to provide the desired tactile feel for the user as the control knob 34 is rotated. It should be understood that the number, shape, orientation and design of the arms 92 and head 98 may vary with the present invention depending on the desired tactile feel characteristics of the damper 80.

Figure 7:
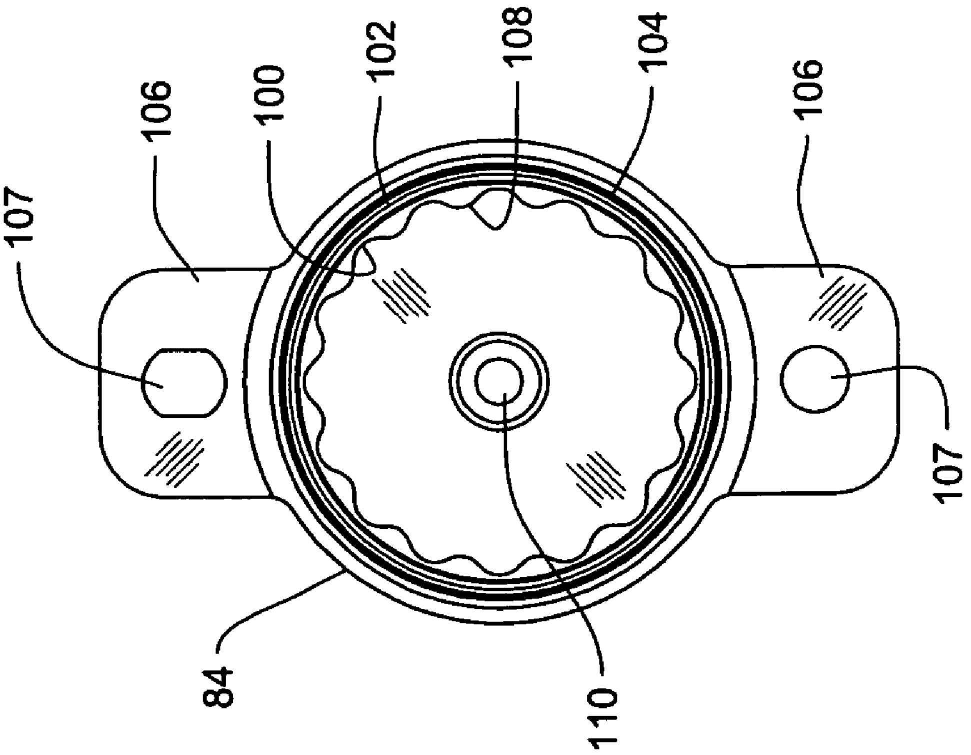
FIG. 7 depicts a top plan view of the housing of the damper of FIG. 5.

Referring to FIG. 7, the housing 84 includes the housing body 104 which defines a generally cylindrical shape. Extending outwardly from the housing body 104 are opposing flanges 106 each including a mounting hole 107 for mounting of the housing body 104 to the circuit board 10. The flanges 106 may be any conventional extension that will permit the selective mounting of the housing 84 to the circuit board 10 or other components. The housing body 104 defines a central opening 110 for permitting the rotatable mounting of the rotatable body 82 to the housing 84. The housing body 104 defines the cylindrical inner wall 102 that further defines a plurality of evenly spaced detents 100 and bumps 108 positioned on the inner wall 102. Each bump 108 is formed between each adjacent detent 100. The detents 100 and bumps 108 are shaped to receive the head 98 of each arm 92 of the rotatable body 82. In addition, the detents 100 are oriented vertically along the inner wall 102 to permit the head 98 on each arm 92 to "float" or move up and down along the inner wall 102 without losing contact with the detents 100 and bumps 108.

Similar to the other exemplary embodiment, in an assembled position, the plurality of arms 92 and heads 98 will engage with the plurality of detents 100. Upon rotation of the control knob 34, which is operatively coupled to the shaft 88 of the rotatable body 82, each of heads 98 will move from one detent 100 across the adjacent bump 108 and will reengage with the next detent 100. As the control knob 34 continues to rotate, each rounded head 98 will continue to move across the next adjacent bump 108 reengaging with the next detent 100, and so on. As above, this movement creates the desired tactile feel for the user as the control knob 34 is rotated. Also as above, it should be understood by those skilled in the art that the detent characteristics can be modified and customized by changing the number, spacing, shape, positioning or configuration of the detents 100, bumps 108 and heads 98.

The damper of either exemplary embodiment and retainer 36 when used in conjunction with the PTF circuit 10 of the circuit board 10 provides an assembly that is less expensive to manufacture due to the elimination of the mounted components and the need to solder, is easier to assemble over existing technology, and is more durable than conventional systems by exhibiting high temperature durability. It should also be understood that while the invention has been described and shown in connection with automobile air control systems, the invention is capable of use in numerous other applications where it is desirable to use PTF circuits and/or damper mechanisms.

Variations and modifications of the foregoing are within the scope of the present invention. It should be understood that the invention disclosed and defined herein extends to all alternative combinations of two or more of the individual features mentioned or evident from the text and/or drawings. All of these different combinations constitute various alternative aspects of the present invention. The embodiments described herein explain the best modes known for practicing the invention and will enable others skilled in the art to utilize the invention. The claims are to be construed to include alternative embodiments to the extent permitted by the prior art.

Various features of the invention are set forth in the following claims.

What is claimed is:

1. A control assembly for use in automobiles comprising:

a printed circuit board including an integrated polymer thick film circuit, the polymer thick film circuit includes at least one potentiometer, a damper mounted to the printed circuit board, the damper includes tactile feel and torque control members, a retainer operatively connected to the damper, a control panel mounted over the retainer, and a control knob operatively connected to the retainer.

2. The control assembly as set forth in claim 1, wherein the damper includes a rotatable body and a housing for receiving the rotatable body.

3. The control assembly as set forth in claim 2, wherein the rotatable body defines a first surface and a second surface, the rotatable body includes a shaft extending outwardly from the first surface and at least one protrusion extending outwardly from the second surface.

4. The control assembly as set forth in claim 3, wherein the tactile feel and torque control members include at least one detent.

5. The control assembly as set forth in claim 4, wherein the housing includes mounting members for selective mounting of the housing onto the printed circuit board.

6. The control assembly as set forth in claim 3, wherein the tactile feel and torque control members include at least one rib.

7. The control assembly as set forth in claim 2, wherein the rotatable body includes at least one arm defining a head for engaging the housing.

8. The control assembly as set forth in claim 1, wherein the retainer defines a front surface and a back surface and includes a shaft extending outwardly from the front surface for operatively engaging the control knob, the retainer also includes electrical contacts positioned on the back surface for electrically communicating with the at least one potentiometer.

9. An air control assembly comprising:

a printed circuit board including an integrated polymer thick film circuit, the polymer thick film circuit includes electrically conductive screen printed material, the printed circuit board defining a front surface and a back surface, a damper mounted to the printed circuit board and located on the back surface, a retainer operatively connected to the damper and located on the front surface, the retainer including a circuit engaging surface for electrically communicating with the electrically conductive screen printed material, a control panel mounted over the retainer, and a control knob operatively connected to the retainer.

10. The air control assembly as set forth in claim 9, wherein the polymer thick film circuit defines at least one potentiometer and at least one resistor.

11. The air control assembly as set forth in claim 9, wherein the damper includes at least one tactile and torque control member.

12. The air control assembly as set forth in claim 9, wherein the damper includes a rotatable body and a housing, the rotatable body includes at least one protrusion, the housing included at least one detent, the at least one protrusion operatively engaging with the at least one detent.

13. The air control assembly as set forth in claim 12, wherein the rotatable body includes a central shaft and a plurality of outwardly extending extensions each including members for engaging with the at least one detent in the housing.

* * * * *